US006250783B1

United States Patent
Stidham et al.

(12) United States Patent
(10) Patent No.: US 6,250,783 B1
(45) Date of Patent: Jun. 26, 2001

(54) EXTERIOR REAR VIEW MIRROR INTEGRAL WARNING LIGHT

(75) Inventors: Mark Stidham, Washington; Dale Gathergood, North Street; Charles Furlotte, Shelby Township, all of MI (US)

(73) Assignee: Britax Vision Systems (North America) Inc., Marysville, MI (US)

( * ) Notice: Subject to any disclaimer, the term of this patent is extended or adjusted under 35 U.S.C. 154(b) by 0 days.

(21) Appl. No.: 09/351,249

(22) Filed: Jul. 12, 1999

Related U.S. Application Data

(63) Continuation of application No. 08/837,866, filed on Apr. 25, 1997, now abandoned.

(51) Int. Cl.[7] ........................................................ B60R 1/12
(52) U.S. Cl. ............................ 362/494; 362/540; 340/475
(58) Field of Search ............................. 362/494, 540, 362/541, 542; 340/468, 475

(56) References Cited

U.S. PATENT DOCUMENTS

| | | |
|---|---|---|
| 1,458,703 | 6/1923 | Harris et al. . |
| 1,563,258 | 11/1925 | Cunningham . |
| 1,602,094 | 10/1926 | Badding . |
| 2,010,138 | 8/1935 | Condon . |
| 2,457,348 | 12/1948 | Chambers . |
| 3,522,584 | 8/1970 | Talbot . |
| 4,475,100 | 10/1984 | Duh . |
| 4,583,155 | 4/1986 | Hart . |
| 4,661,800 | 4/1987 | Yamazaki . |
| 4,809,137 | 2/1989 | Yamada . |
| 4,916,430 | 4/1990 | Vu et al. . |
| 5,059,015 | 10/1991 | Tran . |
| 5,109,214 | 4/1992 | Heidman, Jr. . |
| 5,303,130 | 4/1994 | Wei et al. . |
| 5,313,335 | 5/1994 | Gray et al. . |
| 5,371,659 | 12/1994 | Pastrick et al. . |
| 5,402,103 | 3/1995 | Tashiro . |
| 5,497,306 | 3/1996 | Pastrick . |
| 5,499,169 | 3/1996 | Chen . |
| 5,660,457 | 8/1997 | Lyons . |
| 5,669,704 | 9/1997 | Pastrick . |

FOREIGN PATENT DOCUMENTS

| | | |
|---|---|---|
| 9101029 | 5/1991 | (DE) . |
| 42 19 001 A1 | 12/1992 | (DE) . |
| 41 41 208 A1 | 6/1993 | (DE) . |
| 9409566 | 9/1994 | (DE) . |
| 1961064 | 12/1996 | (DE) . |
| 19736482 | 2/1998 | (DE) . |
| 0 738 627 | 10/1996 | (EP) . |
| 0 820 900 | 5/1998 | (EP) . |
| 2154969 | 9/1985 | (GB) . |
| 2161440 | 1/1986 | (GB) . |
| 2316379 | 2/1998 | (GB) . |
| 58-188733 | 11/1983 | (JP) . |
| 60-161646 | 10/1985 | (JP) . |
| 63-134853 | 9/1988 | (JP) . |
| 9-95177 | 4/1997 | (JP) . |
| WO 89/01425 | 2/1989 | (WO) . |

OTHER PUBLICATIONS

European Patent Office, Patent Abstracts of Japan, Pub. No. 08142745, Pub. Date Apr. 6, 1996, one sheet.

*Primary Examiner*—Stephen Husar
(74) *Attorney, Agent, or Firm*—Warn, Burgess & Hoffmann, P.C.

(57) ABSTRACT

An exterior rear view mirror assembly is disclosed which incorporates a warning light actuatable in conjunction with the vehicle turn signals to alert adjacent motor vehicles of an anticipated turn. The warning light is integrated into a first decorative cover member and may be connected to the vehicle turn signal circuit by way of connectable electrical leads or by an integrally formed plug and outlet arrangement. A second decorative cover member may be substituted for the first decorative cover member when it is not desired to incorporate the warning light.

47 Claims, 3 Drawing Sheets

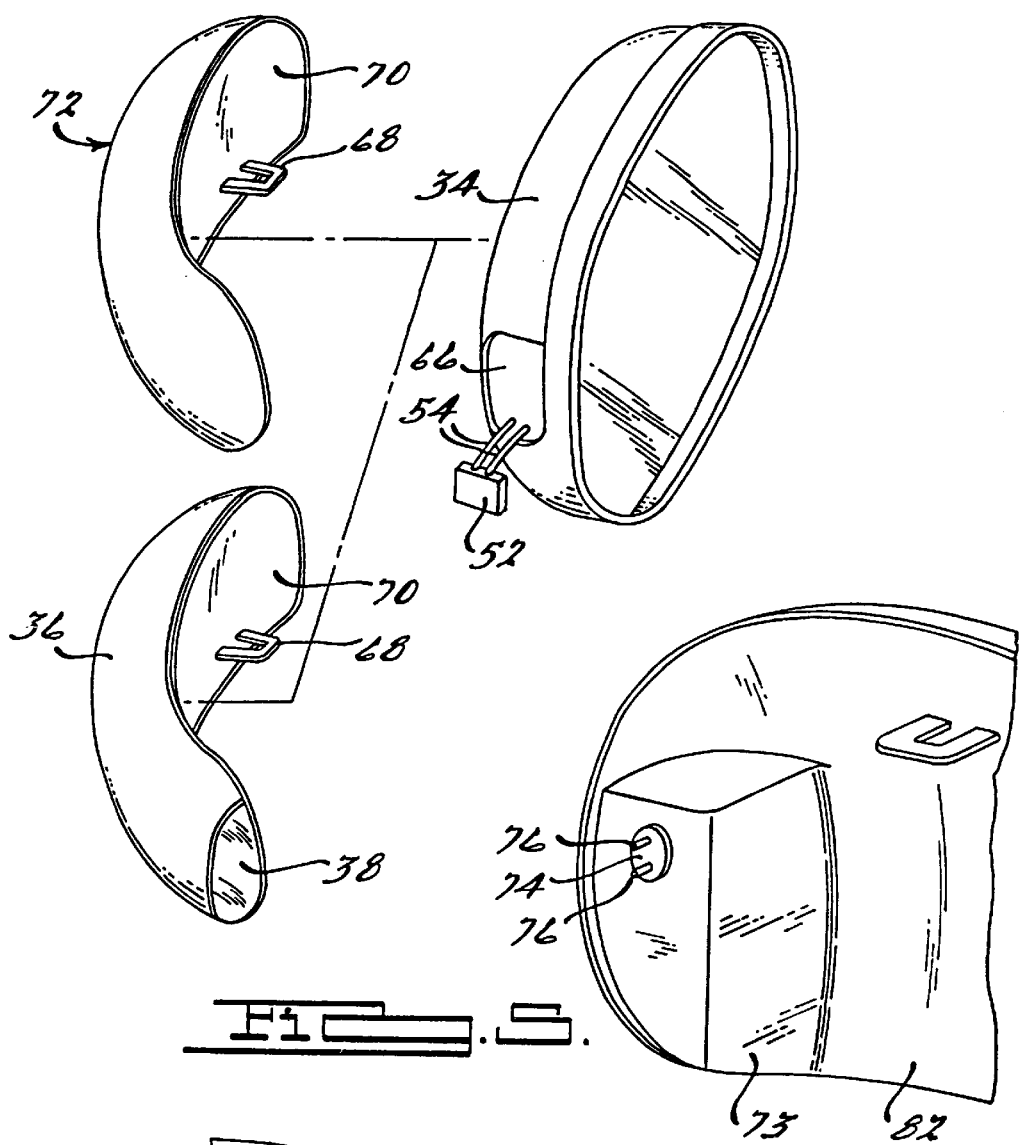
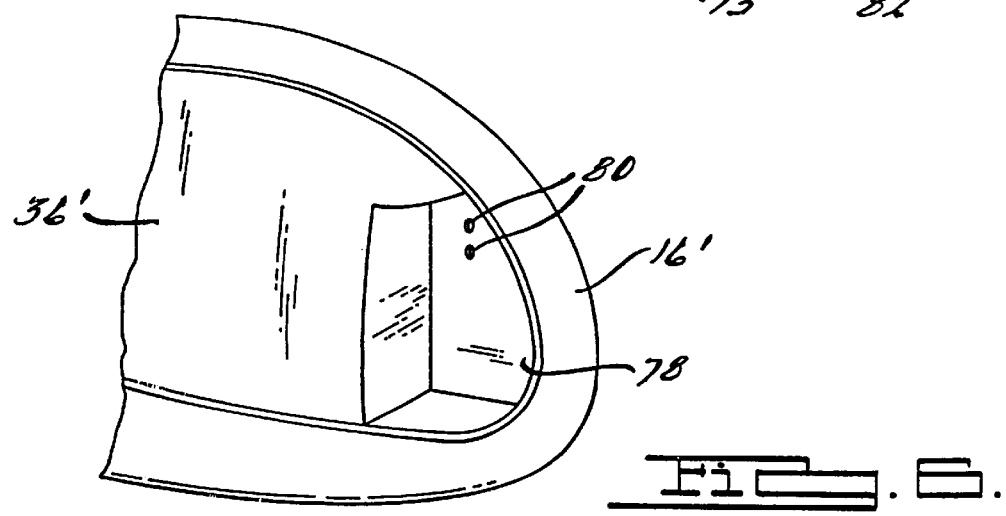

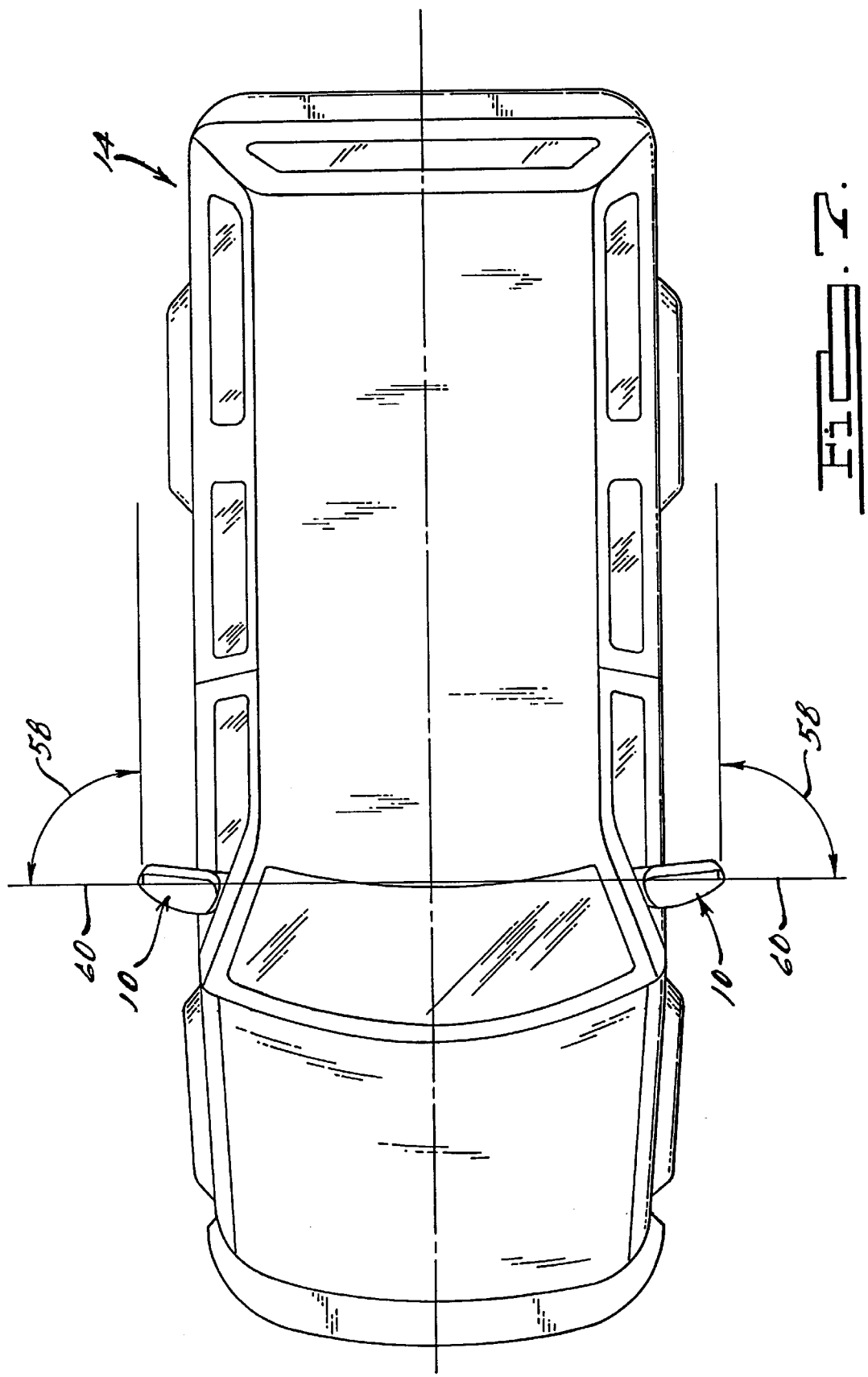

EXTERIOR REAR VIEW MIRROR INTEGRAL WARNING LIGHT

This is a continuation of U.S. patent application Ser. No. 08/837,866, filed Apr. 25, 1997, now abandoned.

BACKGROUND AND SUMMARY OF THE INVENTION

1. Field of the Invention

The present invention relates generally to rear view mirror assemblies for motor vehicles and more particularly to exterior motor vehicle mirror assemblies which incorporate auxiliary warning lights.

2. Discussion

Auxiliary warning lights have long been incorporated on the sides of motor vehicles to provide a means of communicating the intentions of the operator thereof to adjacent vehicles such as for example the intention to change traffic lanes or to make a turn. Such lights are advantageous in providing notice to an adjacent vehicle that may be located in a blind spot and positioned such that the signaling vehicle's tail lights are not visible to the adjacent vehicle's operator.

While incorporation of such auxiliary warning lights is relatively easy and straightforward on work-type vehicles it becomes a somewhat more complex problem when passenger-type vehicles are involved due in part to the importance of aesthetic appearance. Other considerations which may apply to any type of vehicle include the need to position the lights so as to minimize any impact on the vision of the vehicle operator and to maximize the area to the side and rear of the vehicle from which the auxiliary lighting is visible. Additionally, because in many cases the vehicle manufacturer may want to offer the auxiliary lighting arrangement as an option on certain vehicles, it is highly desirable that the lighting system be designed to easily and conveniently integrate with the existing vehicle design so as to minimize added labor and/or costs associated with its installation.

The present invention provides a highly effective and aesthetically pleasing auxiliary lighting system which is integrated into the vehicle's exterior rear view mirror assembly. Preferably, the auxiliary warning light of the present invention will be positioned on the laterally outer surface of the vehicle's exterior rear view mirror in such a manner as to be visible throughout an arc extending about 90 degrees rearwardly from a line extending generally perpendicular to the longitudinal axis of the vehicle. In this manner maximum visibility of the auxiliary warning light is provided to vehicles coming alongside the equipped vehicle while still preventing the emitted light from being visible to the vehicle operator or oncoming traffic. It should be noted, however, that the auxiliary warning light may be positioned so as to be visible to oncoming traffic in addition to the above referenced arc should this be desired and may in fact replace fender side marker lights required in certain countries.

In one form the light is integrated into a removable decorative covering which is secured to the mirror housing and a pigtail is provided for connecting the light to a wiring harness in the interior of the mirror housing. In a modification of this embodiment, the decorative cover member incorporating the light assembly is provided with a plug and the mirror housing includes a receptacle whereby electrical contacts on the cover member may be "plugged into" the receptacle as the decorative cover member is fitted to the housing. This last arrangement further reduces the costs associated with final assembly as no separate effort is required to make the electrical connections for the auxiliary warning light. Further, the integration of the light assembly into the decorative cover member greatly facilitates the offering of the auxiliary lighting feature as an option because only the decorative cover member need be changed to add or delete this auxiliary lighting feature.

Additional advantages and features of the present invention will become apparent from the subsequent description and the appended claims taken in conjunction with the accompanying drawings.

BRIEF DESCRIPTION OF THE DRAWINGS

FIG. 4 is a perspective view of a mirror housing with alternative decorative cover members shown in position for installation thereon, all in accordance with the present invention;

FIG. 5 is a view of the back side of a decorative cover member having a light assembly incorporated therein which includes an integrally formed electrical connector in accordance with the present invention;

FIG. 6 is a view of a portion of a mirror housing incorporating an electrical outlet adapted to mate with the plug shown in FIG. 5, all in accordance with the present invention; and FIG. 7 is a plan view of a motor vehicle having mirrors in accordance with the present invention secured to opposite sides thereof.

DESCRIPTION OF THE PREFERRED EMBODIMENT

Figure 1:
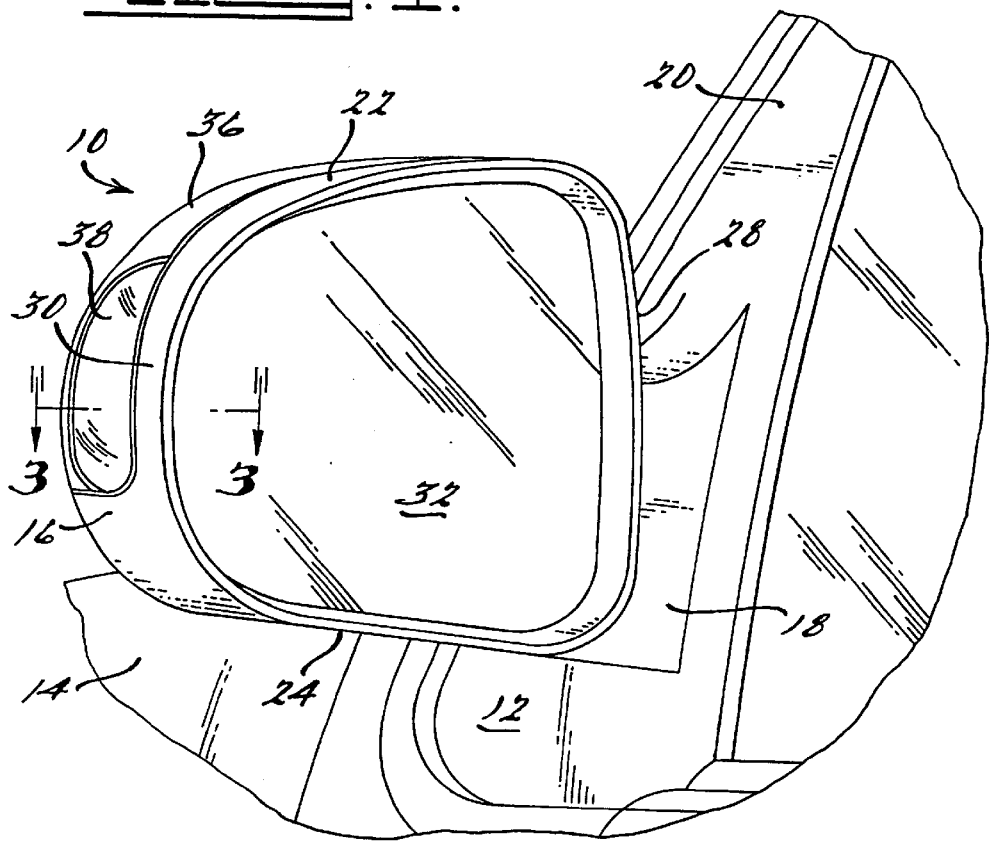
FIG. 1 is a fragmentary perspective view of a side of a motor vehicle having an exterior rear view mirror assembly incorporating an auxiliary warning light provided thereon all in accordance with the present invention.

Referring now to the drawings and in particular to FIGS. 1 and 7, there is shown an exterior rear view mirror assembly indicated generally at 10 installed on the door 12 of a motor vehicle 14. Mirror assembly 10 is of the typical breakaway design and includes a housing 16 pivotably supported on an arm 18 extending outwardly from a generally triangularly shaped mounting plate 20. As shown in FIG. 7, preferably two mirrors 10 will be mounted on a vehicle 14, one on each side thereof.

Housing 16 may be of any desired shape and includes an upper wall portion 22, a lower wall portion 24, a forwardly facing wall portion 26 and inner and outer wall portions 28 and 30 all of which merge smoother together so as to present a pleasing appearance. The rearwardly facing portion of housing 16 is open and is adapted to receive a reflective mirror 32. Mirror 32 may be either of any suitable type such as flat, concave or convex or of the type which automatically adjusts to reduce glare. A suitably shaped support member (not shown) is secured within the housing and serves to movably support mirror within the opening. The support member may include suitable drive motors and the like for remote control adjustment of mirror as well as means for heating the mirror if desired. Housing 16 also contains a recessed portion 34 extending over at least a part of upper, inner, outer and forwardly facing portions 22, 28, 30 and 26 which is adapted to receive a decorative cover member 36 which cover member may be chromed, colored to match the vehicle or of some other finish to present an aesthetically pleasing appearance.

As thus far described, mirror assembly 10 is typical of existing rear view mirror assemblies currently employed on various motor vehicles. However, mirror assembly 10 of the present invention also incorporates an auxiliary warning light assembly 38 integrated with the decorative cover member 36.

Figure 3:
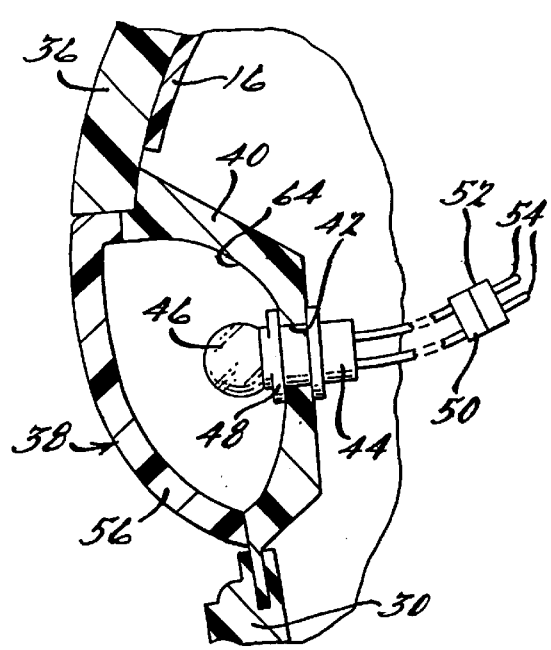
FIG. 3 is a section view of the mirror light assembly of FIG. 1, the section being taken along line 3—3 of FIG. 1.

As best seen with reference to FIG. 3, auxiliary warning light assembly 38 includes a light housing comprising a base member 40 having an opening 42 therein which is adapted to receive a suitable electrical socket 44 having a light source 46 provided thereon. Preferably opening 42 will be designed with two or three radially outwardly and circumferentially extending open portions whereby segmented inner flange 48 of light socket 44 may be inserted and then turned a few degrees to lock it in place. It should be noted that any suitable available light source 46 may be utilized. A suitable pigtail and associated electrical connector 50 is also provided extending outwardly from socket 44 which is adapted to be connected to connector 52 of wiring harness 54 provided in housing 16. A lens member 56 is secured to base member 40 and is designed so as to direct light emitted from light source outwardly from mirror housing through an arc 58 extending approximately 90 degrees rearwardly from a line 60 passing through the mirror 10 and extending substantially perpendicular to the longitudinal axis 62 of the motor vehicle 14. In order to enhance the visible light transmitted by the lens 56 the inner surface 64 of base member 40 will preferably be coated with a reflective material and shaped so as to direct a maximum amount of light from the light source 46 to the lens 56.

Figure 2:
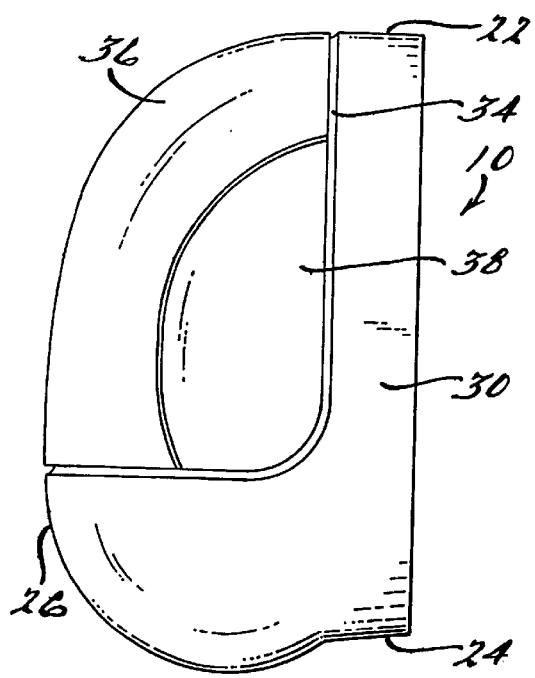
FIG. 2 is a side view of the mirror assembly of FIG. 1.

Light assembly 38 will preferably be mechanically secured to decorative cover member 36 by means of integrally formed snap fasteners so as to form a one-piece assembly therewith. Although any other suitable manner of securing light assembly 38 to decorative cover member 36 may be used such as for example adhesive bonding, sonic welding, molding or even suitable separate fasteners. It is desirable that lens 38 have an outer surface which is shaped so as to form a substantially smooth continuation of the outer contour of decorative cover member as is shown in FIGS. 1 and 2.

In order to accommodate light assembly 38, housing 16 is provided with an opening 66 on the recessed part of outer surface portion 30 which underlies decorative member 36. While housing 16 is shown as providing an opening 66 to accommodate light assembly 38, in some applications it may be desirable to provide an enclosed recess in place thereof. Additionally, as mentioned above, a wiring harness 54 having a suitable electrical connector 52 will be provided within housing 16 so as to be accessible through opening 66 or within the recess if such is provided in place of the opening 66.

In order to assemble decorative member 36 and associate light assembly 38, one need merely interconnect the two electrical connectors 50, 52 and thereafter assemble decorative member 36 to housing 16. As shown in FIG. 4, decorative member 36 is provided with a plurality of spaced outwardly extending tangs 68 on the back surface 70 thereof. These tangs 68 are designed to be received within suitable openings provided in housing 16 and to cooperate with latch members provided therein to retain the decorative member 36 thereon in the same manner as in currently available mirror assemblies of this type.

Warning light assembly 38 is intended to be interconnected with the vehicle turn signal system so that when one or the other of the turn signals are actuated, the light assembly 38 provided on the exterior mirror on the corresponding side of the vehicle will also be actuated. In this manner any other vehicle that may be approaching the vehicle equipped with the subject invention or that may be traveling in its blind spot will immediately be appraised of the equipped vehicle's intention to turn or change lanes even though they may not be in a position to see the vehicle tail lights. However, because the light is positioned on the outer wall portion 30 of the mirror assembly, the housing 16 and mirror 32 will prevent the driver of the vehicle from being distracted by this light when actuated.

As previously mentioned, the subject invention is particularly well suited for offering of the auxiliary warning light as an optional accessory by vehicle manufacturers. As shown in FIG. 4, the overall size and shape of the decorative member 36 incorporating the light assembly 38 is such that it may be easily and conveniently interchanged with a decorative member 72 which does not include the light assembly. Thus, during final assembly of the mirror, the assembler need merely select one or the other of the two decorative cover members 36, 72 for attachment to the mirror housing 16 depending upon the desires of the intended customer. Further, should a purchaser of a vehicle decide at a later date to either add or delete the auxiliary lighting feature, it is only necessary to replace the decorative cover member 36 or 72 with the other cover member.

Referring now to FIGS. 5 and 6, another embodiment of the subject invention is disclosed which further facilitates rapid and low cost assembly of the subject invention. In this embodiment, base member 40, light socket 44 and connector 50 are replaced by a base member 73 and a light socket 74 having a pair of electrically conductive pins 76 extending outwardly therefrom. Mirror housing 16' is also modified by replacing opening 66 with a molded-in cavity 78 in which a pair of spaced openings 80 are provided positioned so as to receive pins 76 when decorative member 82 is assembled thereto. Thus, with this embodiment the assembler need not first interconnect the two electrical connectors 50, 52 but rather needs merely install the decorative cover member 82 during which pins 76 will be received within openings 80 thereby electrically connecting light assembly to the existing vehicle turn signal system. As with the previous embodiment, should a purchaser not desire to include the light assembly, a cover member without the light assembly included is easily assembled to mirror housing 16 and will cover and conceal cavity 78 provided therein.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. An exterior rear view mirror assembly comprising:
   a housing adapted to be secured to an outer surface of a motor vehicle and having a generally rearwardly facing opening;
   a reflective mirror disposed within said opening;
   a first decorative cover member secured in overlying relationship to an outer surface portion of said housing, said decorative member including a light transmitting lens secured thereto, said lens having an outer surface contour forming a substantially smooth continuation of the outer surface of said decorative member
   a light assembly including a housing having a light source therein, said housing being secured to said lens and said light source being operable to provide a signal visible through said light transmitting lens to an adjacent motor vehicle when actuated.

2. An exterior rear view mirror assembly as set forth in claim 1 wherein said light source includes a light socket removably secured to said light housing.

3. An exterior rear view mirror assembly as set forth in claim 2 wherein said housing includes a light socket support member having a reflective inner surface, said inner surface being shaped to direct a maximum amount of light emitted from said light source to said lens.

4. An exterior rear view mirror assembly as set forth in claim 1 wherein said lens is operative to direct light through an arc extending substantially 90 degrees rearwardly from approximately a line passing through said mirror assembly and extending perpendicular to the longitudinal axis of said vehicle.

5. An exterior rear view mirror assembly as set forth in claim 1 wherein said mirror assembly includes an electrical connector adapted to be electrically connected to said vehicle turn signal system, said light source including a mating connector connected to said electrical connector whereby said light source may be actuated when said vehicle turn signal is actuated.

6. An exterior rear view mirror assembly as set forth in claim 5 wherein said mating connector is integrally formed with said light source.

7. An exterior rear view mirror assembly as set forth in claim 1 wherein said light assembly is fixedly secured to said decorative cover member.

8. An exterior rear view mirror assembly as set forth in claim 1 wherein said mirror assembly includes a second decorative cover member, said second decorative cover member being interchangeable with said first decorative cover member, said second decorative cover member being secured to said housing when said light assembly is not desired.

9. An exterior rear view mirror assembly for mounting on a motor vehicle, said mirror assembly comprising:
a housing having an upper wall portion, a lower wall portion, a forwardly facing wall portion and inner and outer wall portion cooperating to define a generally enclosed area open at a rearwardly facing portion thereof;
a mirror movably positioned within said open rearwardly facing portion thereof;
a recessed portion provided in said housing, said recessed portion extending over at least a part of said upper, forwardly facing and outer wall portions;
a wiring harness including a connector disposed in part within said housing, said wiring harness being adapted to be connected to a turn signal circuit of said motor vehicle;
an opening provided in said recessed portion of said outer wall portion, said connector being accessible through said opening;
a decorative cover member received within and substantially covering said recessed portion, said cover member including
a light housing, said light housing including a lens forming a substantially smooth continuation of the outer surface of said decorative cover member,
a light source supported within said light housing, said light source being coupled to said connector whereby said light may be actuated in response to actuation of said turn signal circuit of said motor vehicle.

10. An exterior rear view mirror assembly as set forth in claim 9 wherein said light source includes a pair of electrically conductive prongs projecting outwardly of said light housing, said prongs being connectable to said connector upon assembly of said decorative cover member to said housing.

11. An exterior rear view mirror assembly as set forth in claim 9 wherein said light housing is fixedly secured to a portion of said decorative cover member overlying said outer wall portion.

12. An exterior rear view mirror assembly as set forth in claim 9 wherein said light housing includes a surface operative to direct light from said light source to said lens.

13. An exterior rear view mirror assembly as set forth in claim 9 wherein said lens is operative to direct light outwardly from said outer wall portion in a direction to be visible by other motor vehicles following and traveling alongside side motor vehicle.

14. An exterior rear view mirror assembly for a motor vehicle comprising:
a housing having interconnected upper wall, lower wall, forwardly facing wall, inner wall and outer wall portions and a wiring harness disposed therein, said wiring harness being adapted to be connected to the turn signal circuit of said motor vehicle;
said housing further having a recess extending across at least a part of said upper wall, forwardly facing wall and outer wall portions;
a connector provided in said recess of said outer wall portion;
a first decorative cover member adapted to be received within and substantially cover said recess portion;
a second decorative cover member adapted to be received within and substantially cover said recess portion, said second cover member including a light source provided thereon and a light connector connectable to said connector in said recess of said outer wall portion;
one of said first and second cover members being disposed within said recess.

15. An exterior rear view mirror assembly as set forth in claim 14 wherein said light source is provided in a portion of said second decorative cover member received within said recess on said outer wall portion.

16. An exterior rear view mirror assembly as set forth in claim 15 wherein said light source is actuable in response to actuation of said turn signal circuit.

17. An exterior rear view mirror assembly as set forth in claim 14 wherein said recessed portion of said outer wall portion includes a cavity adapted to receive said light source when said second decorative member is assembled to said housing, said cavity being concealed when said first or said second decorative cover member is assembled to said housing.

18. An exterior rear view mirror assembly as set forth in claim 17 wherein said cavity includes an electrical outlet, said electrical outlet receiving a plug provided on said light source when said second decorative member is assembled to said housing.

19. An exterior rear view mirror assembly for mounting on a motor vehicle, said mirror comprising:
a housing having an upper wall portion, a lower wall portion, a forwardly facing wall portion and inner and outer wall portions co-operating to define a generally enclosed area open at a rearwardly facing portion thereof;
a mirror movably positioned within said open rearwardly facing portion thereof;

a recessed portion provided in said housing;

an electrical connector in said housing;

an opening provided in said recessed portion of said outer wall portion, said connector being accessible through said opening;

a decorative cover member extending over at least a majority of each of said upper, forwardly facing and outer wall portions and substantially covering said recessed portion;

a light housing, said light housing including a lens forming a continuation of the outer surface of said decorative cover member;

a light source supported within said light housing and being connected to said electrical connector.

20. An exterior rear view mirror assembly comprising:

a housing adapted to be secured to an outer surface of a motor vehicle and having a generally rearwardly facing opening;

a reflective mirror disposed within said opening;

a first cover member secured in overlying relationship to an outer surface portion of said housing, said cover member including a light transmitting lens secured thereto, said lens having an outer surface contour forming a substantially smooth continuation of the outer surface of said cover member;

a light assembly having a light source therein, said light source being operable to provide a signal visible through said light transmitting lens.

21. An exterior rear view mirror assembly as set forth in claim 20 wherein said light assembly includes a light housing, said light source including a light socket removably secured to said light housing.

22. An exterior rear view mirror assembly as set forth in claim 21 wherein said housing is secured to said lens.

23. An exterior rear view mirror assembly as set forth in claim 21 wherein said housing includes a light socket support member having a reflective inner surface, said inner surface being shaped to direct a maximum amount of light emitted from said light source to said lens.

24. An exterior rear view mirror assembly as set forth in claim 20 wherein said lens is operative to direct light through an arc extending substantially 90 degrees rearwardly from approximately a line passing through said mirror assembly and extending perpendicular to the longitudinal axis of said vehicle.

25. An exterior rear view mirror assembly as set forth in claim 20 wherein said mirror assembly includes an electrical connector adapted to be electrically connected to said vehicle turn signal system, said light source including a mating connector connected to said electrical connector whereby said light source may be actuated when said vehicle turn signal is actuated.

26. An exterior rear view mirror assembly as set forth in claim 25 wherein said mating connector is integrally formed with said light source.

27. An exterior rear view mirror assembly as set forth in claim 20 wherein said light assembly is fixedly secured to said decorative cover member.

28. An exterior rear view mirror assembly as set forth in claim 20 wherein said mirror assembly includes a second decorative cover member, said second decorative cover member being interchangeable with said first decorative cover member, said second decorative cover member being secured to said housing when said light assembly is not desired.

29. An exterior rear view mirror assembly comprising:

a housing adapted to be secured to an outer surface of a motor vehicle and having a generally rearwardly facing opening;

a reflective mirror disposed within said opening;

a first cover member secured in overlying relationship to an outer surface portion of said housing, said cover member including an accessory module secured thereto, said accessory module having an outer surface contour forming a substantially smooth continuation of the outer surface of said cover member.

30. An exterior rear view mirror assembly as set forth in claim 29 wherein the cover member is detachable from the rear view mirror assembly.

31. An exterior rear view mirror assembly as set forth in claim 29 further comprising a light assembly including a housing having a light source therein, said housing being secured to said lens and said light source being operable to provide a signal visible through said light transmitting lens to an adjacent motor vehicle when actuated.

32. An exterior rear view mirror assembly as set forth in claim 29 wherein said accessory module is fixedly secured to said cover member.

33. An exterior rear view mirror assembly as set forth in claim 29 wherein said mirror assembly includes a second cover member, said second cover member being interchangeable with said first cover member, said second cover member being secured to said housing when said accessory module is not desired.

34. An exterior rear view mirror assembly comprising:

a housing adapted to be secured to an outer surface of a motor vehicle and having a generally rearwardly facing opening;

a reflective mirror disposed within said opening;

a first decorative cover member secured in an overlying relationship to an outer surface portion of said housing, said decorative member including a light transmitting lens secured thereto, said lens having an outer surface contour forming a substantially smooth continuation of the outer surface of said decorative member; and a light assembly including a housing having a light source therein, said housing being secured to said lens and said light source being operable to provide a signal visible through said light transmitting lens to an adjacent motor vehicle when actuated, wherein said first decorative cover is removable and replaceable with a second cover member.

35. An exterior rear view mirror assembly for mounting on a motor vehicle, said mirror assembly comprising:

a housing having an upper wall portion, a lower wall portion, a forwardly facing wall portion and inner and outer wall portion cooperating to define a generally enclosed area open at a rearwardly facing portion thereof;

a mirror movably positioned within said open rearwardly facing portion thereof;

a recessed portion provided in said housing, said recessed portion extending over at least a part of said upper, forwardly facing and outer wall portions;

a wiring harness including a connector disposed in part within said housing, said wiring harness being adapted to be connected to a turn signal circuit of said motor vehicle;

an opening provided in said recessed portion of said outer wall portion, said connector being accessible through said opening;

a decorative cover member received within and substantially covering said recessed portion, said cover member including a light housing, said light housing including a lens forming a substantially smooth continuation of the outer surface of said decorative cover member, and a light source supported within said light housing, said light source including a pair of electrically conductive prongs projecting outwardly of said light housing, said prongs being connectable to said connector upon assembly of said decorative cover member to said housing, and being coupled to said connector whereby said light may be actuated in response to actuation of said turn signal circuit of said motor vehicle.

36. An exterior rear view mirror assembly comprising:

a housing adapted to be secured to an outer surface of a motor vehicle and having a generally rearwardly facing opening;

a reflective mirror disposed within said opening;

a first cover member secured in overlying relationship to an outer surface portion of said housing, said cover member including a light transmitting lens secured thereto, said lens having an outer surface contour forming a substantially smooth continuation of the outer surface of said cover member, said first cover member being removable for replacement with a second cover member; and a light assembly having a light source therein, said light source being operable to provide a signal visible through said light transmitting lens.

37. An exterior rear view mirror assembly comprising:

a contoured housing adapted to be secured to an outer surface of a motor vehicle and having a generally rearwardly facing opening;

a reflective mirror disposed within said opening;

a first contour following member removably secured in overlying relationship to an outer surface portion of said housing, said member including a light transmitting lens secured thereto, said lens having an outer surface contour forming a substantially smooth continuation of the outer surface of said housing; and a light assembly including a housing having a light source therein, said housing being secured to said lens and said light source being operable to provide a signal visible through said light transmitting lens to an adjacent motor vehicle when actuated.

38. An exterior rear view mirror assembly comprising:

a housing adapted to be secured to an outer surface of a motor vehicle and having a generally rearwardly facing opening;

a reflective mirror disposed within said opening;

a first cover member interchangeably secured to an outer surface portion of said housing, said cover member including a light transmitting lens secured thereto, said lens having an outer surface contour forming a substantially smooth continuation of at least a portion of the outer surface of said cover member; and a light assembly including a housing having a light source therein, said housing being secured to said lens and said light source being operable to provide a signal visible through said light transmitting lens to an adjacent motor vehicle when actuated.

39. An exterior rear view mirror assembly for mounting on a motor vehicle, said mirror assembly comprising:

a housing having an upper wall portion, a lower wall portion, a forwardly facing wall portion and inner and outer wall portion cooperating to define a generally enclosed area open at a rearwardly facing portion thereof;

a mirror movably positioned within said open rearwardly facing portion thereof;

a recessed portion provided in said housing, said recessed portion extending over at least a part of said upper, forwardly facing and outer wall portions;

a wiring harness including a connector disposed in part within said housing, said wiring harness being adapted to be connected to a turn signal circuit of said motor vehicle;

an opening provided in said recessed portion of said outer wall portion, said connector being accessible through said opening;

a modular member removably received within and substantially covering said recessed portion, said member being a one piece assembly including a light housing, said light housing including a lens forming a substantially smooth continuation of the outer surface of said decorative cover member, and a light source supported within said light housing, said light source being coupled to said connector whereby said light may be actuated in response to actuation of said turn signal circuit of said motor vehicle, said modular member being removably received in said recessed portion for insertion and replacement as a single unit.

40. A method of assembly of an exterior rear view mirror comprising:

providing a rear view mirror housing having a contoured outer surface having a cavity therein, said cavity including tang and latch portions thereof;

providing an integrally formed light assembly which may be removably assembled and secured in place into said cavity, a portion thereof having portions for cooperating with the tang and latch portion, said light assembly including a light source, a reflector and a lens portion which substantially follows the outer contour of said housing; and assembling said light assembly into said cavity, thereby removably securing said assembly in said housing.

41. An exterior rear view mirror assembly comprising:

a housing adapted to be secured to an outer surface of a motor vehicle and having a generally rearwardly facing opening, wherein a portion of said housing forms an exterior finished surface of said mirror;

a reflective mirror juxtaposed with said opening;

a first decorative cover member secured to said housing and continuous with said finished surface of said housing, said decorative member including a light transmitting lens secured thereto, said lens having an outer surface contour forming a continuation of the outer surface of said housing; and a light assembly having a light source therein, said light source being operable to provide a signal visible through said light transmitting lens to an adjacent motor vehicle when actuated.

42. An exterior rear view mirror assembly comprising:

a housing adapted to be secured to an outer surface of a motor vehicle and having a generally rearwardly facing opening;

a reflective mirror juxtaposed with said opening;

a first member secured to said housing, said member including a light transmitting lens secured thereto, said lens and said first member having an outer surface contour forming a substantially smooth continuation of an outer surface of said housing; and a light assembly having a light source therein, said light source being operable to provide a signal visible through said light transmitting lens while not being visible to said driver.

43. An exterior rear view mirror assembly comprising:

a contoured housing adapted to be secured to an outer surface of a motor vehicle and having a generally rearwardly facing opening;

a reflective mirror juxtaposed with said opening;

a first contour following member removably secured in overlying relationship to an outer surface portion of said housing, said member including a recessed portion for receiving a light module having a lens secured thereto, said lens having an outer surface contour forming a substantially smooth continuation of the outer surface of said housing, and said light module secured in said recessed portion; and said light module having a light source therein, being operable to provide a signal visible through said light transmitting lens to an adjacent motor vehicle when actuated.

44. An exterior rear view mirror assembly comprising:

a housing adapted to be secured to an outer surface of a motor vehicle and having a generally rearwardly facing opening, a portion of said housing having an outer contour;

a reflective mirror juxtaposed with said opening;

a first member secured to an outer surface portion of said housing, said cover member including a light transmitting lens secured thereto, said lens having an outer surface contour forming a substantially smooth continuation of at least a portion of the outer surface of said first member, said first member and said lens forming a substantial portion of said housing and being flush with its contoured surface; and a light assembly including a housing having a light source therein, said housing being secured to said lens and said light source being operable to provide a signal visible through said light transmitting lens to an adjacent motor vehicle when actuated.

45. An exterior rear view mirror assembly comprising:

a contoured housing adapted to be secured to an outer surface of a motor vehicle and having a generally rearwardly facing opening having a rearward side edge;

a reflective mirror juxtaposed with said opening;

a first opaque member secured in said housing and forming a contiguous contour with said housing, said member including a light transmitting lens secured thereto, said lens having an outer surface contour forming a substantially smooth continuation of the outer surface of said member and being forward of said rearward side edge so as not to be visible by said driver; and a light assembly including a housing having a light source therein, said light source being operable to provide a signal visible through said light transmitting lens to an adjacent motor vehicle when actuated.

46. An exterior rear view mirror assembly comprising:

a contoured housing adapted to be secured to an outer surface of a motor vehicle and having a generally rearwardly facing opening;

a reflective mirror juxtaposed with said opening;

a first member secured to said housing forming a contiguous contoured surface with said housing, said first member including a light transmitting lens secured thereto, said lens having an outer surface contour forming a substantially smooth continuation of the contoured surface of said first member; and a light assembly positioned underlying said lens such that said first member does not overlap said light assembly, said light assembly including a housing having a light source therein, said housing being secured to said lens and said light source being operable to provide a signal visible through said light transmitting lens to an adjacent motor vehicle when actuated.

47. A method of assembly of an exterior rear view mirror comprising:

providing a rear view mirror housing having an outer surface including a cavity therein, a two piece modular member, said modular member including a first member forming an outer surface of said mirror housing and including a light assembly receiving portion formed therein;

providing a second modular light assembling received in said first member; and combining said modular light member with said first member and said housing for forming an integral unit.

* * * * *